(12) United States Patent  
Morse et al.

(10) Patent No.: US 11,953,909 B2  
(45) Date of Patent: Apr. 9, 2024

(54) MOBILITY PLATFORM FOR AUTONOMOUS NAVIGATION OF CONSTRUCTION SITES

(71) Applicant: Rugged Robotics Inc., Houston, TX (US)

(72) Inventors: Derrick Morse, Houston, TX (US); Giovani Diniz, Houston, TX (US)

(73) Assignee: Rugged Robotics Inc., Houston, TX (US)

( * ) Notice: Subject to any disclaimer, the term of this patent is extended or adjusted under 35 U.S.C. 154(b) by 304 days.

(21) Appl. No.: 16/867,409

(22) Filed: May 5, 2020

(65) Prior Publication Data

US 2020/0356102 A1 Nov. 12, 2020

Related U.S. Application Data

(60) Provisional application No. 62/843,815, filed on May 6, 2019.

(51) Int. Cl.
| | |
|---|---|
| *G05D 1/02* | (2020.01) |
| *G01C 21/20* | (2006.01) |
| *G05D 1/00* | (2006.01) |

(52) U.S. Cl.
CPC ............ *G05D 1/0219* (2013.01); *G01C 21/20* (2013.01); *G05D 1/0231* (2013.01); *G05D 1/0257* (2013.01); *G05D 2201/0202* (2013.01)

(58) Field of Classification Search
CPC ........ G01C 21/34; G01C 21/16; G01C 21/30; G01C 21/3476; G01C 21/165;

(Continued)

(56) References Cited

U.S. PATENT DOCUMENTS

| 5,453,931 A | 9/1995 | Watts, Jr. |
| 5,755,072 A | 5/1998 | Lingafelter |

(Continued)

FOREIGN PATENT DOCUMENTS

| CN | 104296733 A | 1/2015 |
| CN | 108700876 A | 10/2018 |

(Continued)

OTHER PUBLICATIONS

Thrun et al., A Real-Time Algorithm for Mobile Robot Mapping With Applications to Multi-Robot and 3D Mapping. IEEE International Conference on Robotics. Apr. 2000. 8 pages.

(Continued)

*Primary Examiner* — Kenneth J Malkowski  
*Assistant Examiner* — Carville Albert Hollingsworth, IV  
(74) *Attorney, Agent, or Firm* — Wolf, Greenfield & Sacks, P.C.

(57) ABSTRACT

An autonomous tool including a multi-sensor package enabling identification of the position of the tool in a construction site so that the tool may navigate to locations where tasks are performed. The tool may include at least one sensor from the group of a drive system encoder, stereo camera, inertial measurement unit, optical flow sensor, and LiDAR. The tool may include a holonomic drive allowing at least one tool of the mobility platform to reach the extremities of a construction site. The platform may be used as part of a system that receives design information relating to the construction site and tasks to be performed by the tool and then generates commands that control the tool to navigate along a path generated to include landmarks within range of and therefore detectable by the sensors for a large percentage of the path.

14 Claims, 10 Drawing Sheets

(58) Field of Classification Search
CPC .............. G01C 21/1652; G01C 21/005; G01C 21/206; G01C 21/20; G05D 1/0274; G05D 1/0219; G05D 1/0231; G05D 1/0257; G05D 2201/0202
See application file for complete search history.

(56) References Cited

U.S. PATENT DOCUMENTS

| | | | |
|---|---|---|---|
| 6,064,940 A | | 5/2000 | Rodgers et al. |
| 6,330,503 B1 | | 12/2001 | Sharp et al. |
| 8,060,344 B2 | | 11/2011 | Stathis |
| 8,115,439 B2 | | 2/2012 | Yourlo et al. |
| 8,291,855 B2 | | 10/2012 | Hoerl, Jr. et al. |
| 9,747,698 B2 | | 8/2017 | Stathis |
| 9,858,712 B2 | | 1/2018 | Stathis |
| 2005/0055142 A1 | | 3/2005 | McMurtry et al. |
| 2007/0059098 A1 | | 3/2007 | Mayfield et al. |
| 2007/0100496 A1 | | 5/2007 | Forell |
| 2011/0039021 A1 | | 2/2011 | Persson et al. |
| 2011/0153338 A1* | | 6/2011 | Anderson ................. G01S 1/68 705/1.1 |
| 2012/0028649 A1* | | 2/2012 | Gupta ................... H04W 4/029 455/456.1 |
| 2013/0310971 A1 | | 11/2013 | Prouty |
| 2017/0278030 A1 | | 9/2017 | Pettersson et al. |
| 2018/0339409 A1 | | 11/2018 | Williams et al. |
| 2018/0339410 A1* | | 11/2018 | Williams ............... G01C 21/20 |
| 2018/0347982 A1 | | 12/2018 | Nam et al. |
| 2019/0235088 A1* | | 8/2019 | Tanaka ................. G01C 21/165 |
| 2020/0159227 A1* | | 5/2020 | Cohen .................... G05D 1/027 |

FOREIGN PATENT DOCUMENTS

| | | |
|---|---|---|
| CN | 108797669 A | 11/2018 |
| JP | 2018-538647 A | 12/2017 |
| KR | 20100024572 | 3/2010 |

OTHER PUBLICATIONS

International Search Report and Written Opinion for International Application No. PCT/US2020/031524, dated Oct. 8, 2020.
Written Opinion of the International Preliminary Examining Authority dated May 28, 2021 in connection with International Application No. PCT/US2020/031524.
International Preliminary Report on Patentability Chapter II dated Sep. 14, 2021 in connection with International Application No. PCT/US2020/031524.
Chinese Office Action dated Mar. 10, 2023 in connection with Chinese Application No. 202080042623.9.

* cited by examiner

MOBILITY PLATFORM FOR AUTONOMOUS NAVIGATION OF CONSTRUCTION SITES

RELATED APPLICATIONS

This application claims the benefit under 35 U.S.C. § 119(e) of U.S. Provisional No. 62/843,815, filed May 6, 2019, which is hereby incorporated by reference in its entirety.

FIELD

Disclosed embodiments are related to autonomous positioning of tools at construction sites and related methods of use.

BACKGROUND

Some attempts have been made to deploy autonomous or semi-autonomous systems in construction sites which may perform targeted tasks. These conventional systems typically employ total station surveying equipment, or beaconed navigation systems which require the placement of navigational equipment or beacons in known locations in a construction site.

SUMMARY

In some embodiments, a method for operating a mobility platform in a construction site based on an indication of one or more tasks to be performed at one or more task locations in the construction site and a design file representing in at least two dimensions the construction site, where the design file comprises one or more landmarks in the construction site, and where the mobility platform includes at least one tool mounting location, includes, with at least one processor, generating and/or executing a path for the mobility platform based on the locations of one or more of the landmarks and the one or more task locations by iteratively adjusting the path to increase accuracy by compensating for detected error or by increasing an amount of the path within a threshold distance of the one or more landmarks. The method also includes providing task commands to a controller disposed on the mobility platform based on the generated path and one or more tasks.

In some embodiments, a mobility platform for navigation in a construction site includes a drive system configured to move the mobility platform in three degrees of freedom, at least one actuator operatively coupled to the drive system and configured to move the drive system to correspondingly move the mobility platform in at least one of the three degrees of freedom when activated, at least one tool operable to perform one or more tasks in the work site. The mobility platform also includes a controller having a motion control unit configured to selectively activate or deactivate the at least one actuator, and a tool control unit configured to selectively activate or deactivate the at least one tool to perform the one or more tasks.

In some embodiments, a method for operating a mobility platform in a construction site, where the platform comprises a plurality of sensors having an operational range within which the sensors are capable of detecting landmarks, includes identifying locations of the one or more landmarks in the construction site and identifying one or more tasks to be performed at one or more task locations in the construction site. The method also includes generating a path for the mobility platform based on the locations of one or more of the landmarks and the one or more task locations by iteratively adjusting the path to increase accuracy by compensating for detected error or by increasing an amount of the path within a threshold distance of the one or more landmarks, where the threshold distance is based on the operational range of the sensors.

In some embodiments, a method for operating a mobility platform in a construction site includes identifying locations of the one or more landmarks in the construction site, moving the mobility platform along a navigational path based at least partly on the locations of the one or more landmarks, sensing the one or more landmarks with at least one selected from the group of a stereo camera, inertial measurement unit, optical flow sensor, and LiDAR unit when the mobility platform is moved along the path, and correcting the movement of the mobility platform based on information provided by the at least one of a drive system encoder, stereo camera, inertial measurement unit, optical flow sensor, and LiDAR unit.

In some embodiments, a method for operating a mobility platform in a construction site based on an indication of one or more tasks to be performed at one or more task locations in the construction site and a design file representing in at least two dimensions the construction site, where the design file comprises one or more landmarks in the construction site, where the mobility platform includes at least one tool mounting location, includes, with at least one processor, generating a path for the mobility platform based on the locations of one or more of the landmarks and the one or more task locations by iteratively adjusting the path to increase a projected position accuracy of the mobility platform based on projected errors in position estimation from continuous displacement and/or sensing position relative to one or more landmarks along the path, and providing task commands to a controller disposed on the mobility platform based on the generated path and one or more tasks.

A method for operating a mobility platform in a construction site, where the platform comprises a plurality of sensors having an operational range within which the sensors are capable of detecting landmarks, includes identifying locations of the one or more landmarks in the construction site, identifying one or more tasks to be performed at one or more task locations in the construction site, and generating a path for the mobility platform based on the locations of one or more of the landmarks and the one or more task locations by iteratively adjusting the path to increase a projected position accuracy of the mobility platform based on projected errors in position estimation from continuous displacement and/or sensing position relative to one or more landmarks along the path.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
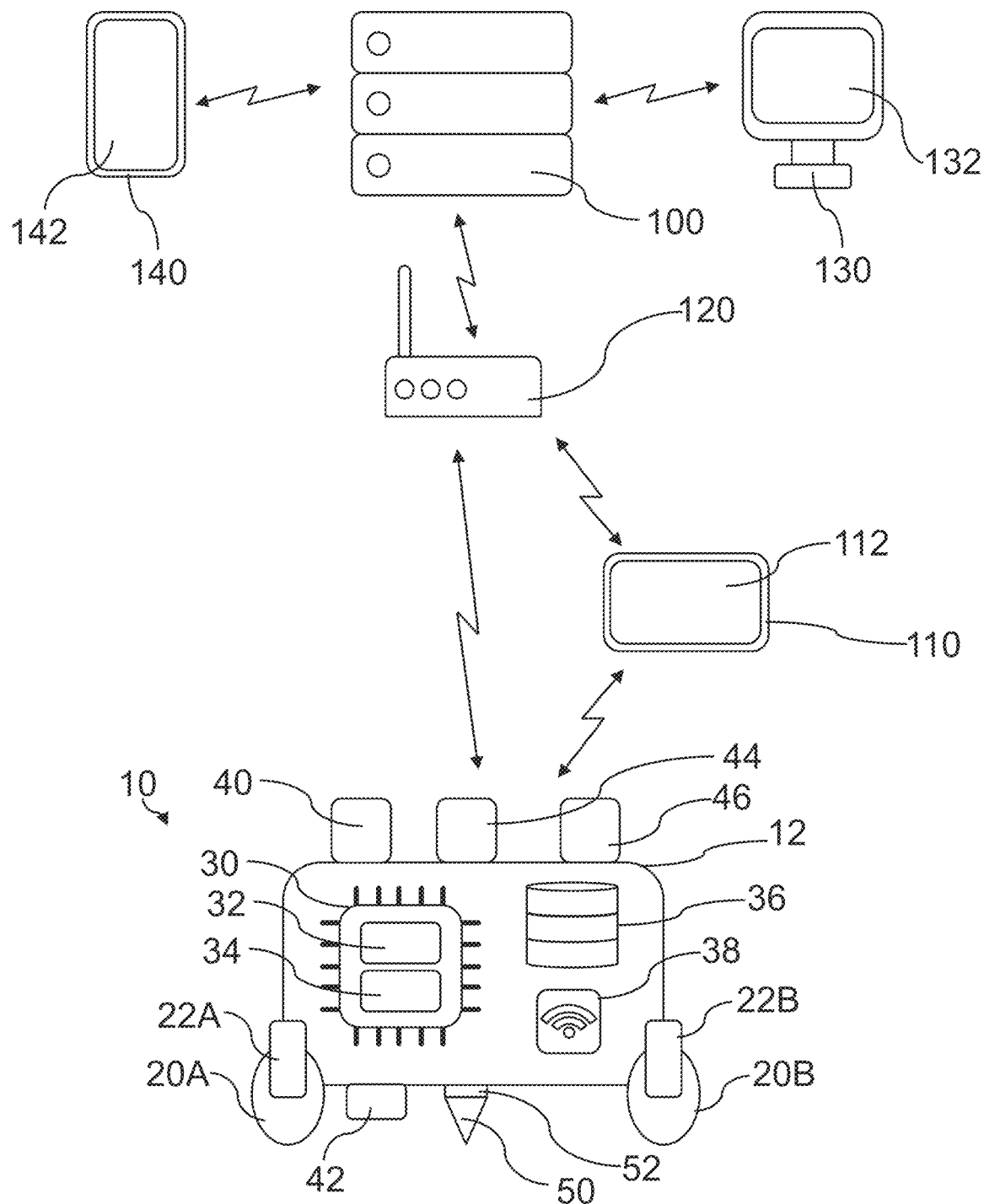
FIG. 1 is a schematic of an exemplary embodiment of a construction assistance system with a mobility platform for navigation in a construction site.

Construction productivity, measured in value created per hour worked, has steadily declined in the US over the past 50 years. Low productivity, combined with a shortage of craft labor and higher labor costs, are major pain points for the construction industry. Some conventional efforts have been made to automate or semi-automate tasks in a construction site, but these conventional systems require constant human supervision, are susceptible to navigation errors, and have limited mobility in tight spaces, all of which restrict the ability of such conventional system to perform useful tasks in a construction site. Additionally, many conventional systems require placement of active equipment or beacons that aid in navigation in a work site which complicates employing automated platforms rapidly and at scale.

In view of the above, the inventors have recognized techniques for the design and operation of a mobility platform that can support a variety of tools and can navigate precisely and repeatedly in a workspace to enable automated tasks to be performed with the tool. A system using a mobility platform to autonomously position a tool within a construction worksite using one or more of the techniques described herein, may increase construction productivity by overcoming one or more of the disadvantages of prior efforts to automate construction tasks.

According to one aspect, the mobility platform may employ multiple sensors which may be used to compute comparable positions of the mobility platform inside a workspace. Some of the multiple sensors may be used in local position determination and others may be used in separate, global position determination, so that comparable, distinct local and global positions are computed independently. Positions for the platform, determined from outputs of sensors operating independently, may be compared to compute a position accuracy value which may be used to alter one or more parameters of the platform as it travels a path. For example, a platform may include a drive system encoder, camera, stereo camera, optical flow sensor, inertial measurement unit, and a LiDAR unit, information from any of which is incorporated to improve precision and accuracy of automated navigation of a construction site by a mobility platform. These sensors may detect existing features (e.g., structures) in a workspace, allowing a mobility platform to be deployed with no additional deployment of specific beacons or separate navigational equipment.

According to another aspect, the mobility platform may include a holonomic drive system for a platform that navigates a construction site. The holonomic drive system may allow the mobility platform to move in three degrees of freedom so that a tool mounted on the mobility platform may reach the extremities of a work space to perform one or more tasks. In some embodiments, the holonomic drive may allow the mobility platform to move omnidirectionally in the three degrees of freedom. In one embodiment, the holonomic drive system includes four wheels which are independently actuable and independently swivel to allow the mobility platform to translate in a plane, rotate about a central axis, or a combination of the two (i.e., three degrees of freedom).

According to yet another aspect, a construction assistance system may include one or more processors that may generate task commands to control the mobility platform. These processors may be programmed to implement a design file processing tool, which generates relevant navigational information from a standardized design file (such as a .csv, .dwg, .dxf, dwg, .rvt, .nwd, .ifc, etc.) used in the construction industry. The design file may be processed for existing or anticipated features in a work site, such as survey control points, survey control lines, structural elements, or other structural features, which may be identified as one or more landmarks to be used during navigation of the mobility platform. For example, in some cases, such features may relate to structural elements of a building (e.g., load bearing wall, column, stairwell, elevator shaft, etc.). The design file processing tool may be implemented on a mobility platform or on a remote server in communication with the mobility platform, or both. In some embodiments, the server may be accessible to a user via the internet or other network who may upload a design file and provide other inputs relating to tasks to be performed autonomously.

Some task commands may control movement of the platform. Other task commands may control operation of the tool. The design file also may be scanned for one or more task locations for performing one or more task commands. Alternatively, locations for performance of task commands may be received as user input. The outer most task locations may be used as constraints to determine the operational envelope of the mobility platform. The processing tool may generate a path based on the one or more landmarks and the one or more task locations. The path may be computed taking into consideration the locations of the landmarks. Path segments with larger numbers of landmarks in range of sensors on the mobility platform may be selected over path segments with fewer landmarks in range. Accordingly, a system according to exemplary embodiments described herein may allow an architect, construction supervisor, or tradesman to upload files to a design file processing tool and allow a system to automatically determine an optimized path to maximize precision and accuracy of the mobility platform navigation.

According to yet another aspect, a mobility platform for navigating a construction site may determine a positional accuracy and calibrate a controller based on known landmarks, such as control points or control lines. In some embodiments, the mobility platform interprets data from at least one sensor (e.g., inertial measurement unit, optical flow sensor or mono camera, drive system encoder, stereo camera, odometer, etc.) at a high frequency and data from a second at least one sensor (e.g., LiDAR, image recognition, etc.) at a low frequency. The data interpreted at a high frequency may be integrated to determine a first local position estimate by determining a change in the position of the mobility platform relative to a last known position. The data interpreted at a low frequency may be used to determine a second global position of the robotic system relative to known landmarks by identifying said landmarks and establishing the absolute position of the mobility platform relative to a coordinate frame. However, data from exemplary sensors described herein may be interpreted at any suitable frequency to determine separate local and global positions, as the present disclosure is not so limited. In some embodiments, the local position estimates may enable continuous location mapping while global positioning estimates may enable discrete location mapping. For example, the mobility platform may employ odometry from wheels for continuous location mapping to be used for local position estimates, while sensors detecting one or more landmarks may be used for discrete location mapping to be used for global position estimates. The first position and second position may be compared to determine a position accuracy value. When the position accuracy value falls below a predetermined threshold, the mobility platform may navigate to a known location in the work site (e.g., a landmark such as a control point or control line) and recalibrate the controller to compensate for error in the high frequency and/or low frequency sensors. Such an arrangement allows for the robotic system navigation controller to be tuned during operation and compensate for error in sensors or modify one or more parameters of the controller (e.g., one of proportional, integral, or derivative constants when a PID or PIV controller is employed). Of course, while exemplary embodiments herein describe a mobility platform having one or more sensors selected from the group of inertial measurement units, optical flow sensors, mono cameras, stereo cameras, odometers, and LiDARs, any suitable sensors may be employed to provide position, velocity, and/or acceleration information to a mobility platform, as the present disclosure is not so limited.

According to yet another aspect, an automated robotic system may be integrated with a human operated workstation located at a construction site to improve path optimization, calibrate a navigation controller, and allow for manual control in some cases. The ground station may communicate to a mobility platform controller and/or a remote server. When a path is generated by the remote server and/or controller, the path may be sent to a graphical user interface at the ground station for inspection by a human operator. The operator may reject the path, causing it to be recomputed by the controller and/or remote server, modify the path manually, or accept the path. Upon initial or final acceptance of the path, the mobility platform may autonomously navigate along the path. Such an arrangement may allow a human operator to check the path of a mobility platform before movement or any task completion, as well as fine tune the path for variable conditions in a construction site.

The mobility platform of exemplary embodiments described herein may be capable of performing various tasks and services through the transportation, positioning, and operation of automated tools, without human operators. Tasks which may be performed include translating digital designs into real-world layouts (i.e. accurately marking the location of specific architectural/engineering features on the job site), material handling (transporting materials and equipment to the appropriate locations), performing portions of installation work (e.g., marking mounting locations, drilling holes, installing hangers, fabricating materials, preparing equipment, etc.), and/or installing various building systems (e.g., wall systems, mechanical systems, electrical systems, plumbing systems, sprinkler systems, telephone/data systems, etc.). A mobility platform may be fitted with one or more tools, including, but not limited to: marking systems (e.g., printers, brushes, markers, etc.), material handling and manipulation systems (arms, grapples, grippers, etc.), rotary tools (e.g., drills, impact wrenches, saws, grinders, etc.), reciprocating tools (e.g., saws, files, etc.), orbital tools (e.g., sanders, cutters, etc.), impact tools (e.g., hammers, chipping tools, nailers, etc.), and other power tools, including the equipment required to support them (e.g., compressors, pumps, solenoids, actuators, presses, etc.).

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a schematic of one embodiment of a construction assistance system including a mobility platform 10 for navigation in a construction site. As shown in FIG. 1, the system may include one or more computer processors that interpret various types of data. Those computer processors may be programmed to implement functions such as extracting information about a construction site from a design file, receiving input specifying construction tasks to be performed, determining or executing a path for the mobility platform to traverse to perform tasks and generating commands to the mobility platform to perform those tasks. Those processors may be in the same location or distributed across multiple locations. In some embodiments, some processors may be on the mobility platform 10 and others may be in one or more remote devices that may be connected to the internet or other communication network.

As shown in FIG. 1, the mobility platform may navigate and operate autonomously or semi-autonomously and may communicate with one or more remote or local devices. In the embodiment of FIG. 1, the mobility platform includes a variety of controllers and sensors mounted on a chassis 12 which enable high precision navigation in a construction site without reliance on navigational beacons or equipment, placed in the construction site. In particular, the robotic system of FIG. 1 includes a task server 30 having a motion control unit 32 and a tool control unit 34.

The motion control unit is configured to control a drive system including at least a first wheel 20A driven by a first actuator 22A and a second wheel 20B driven by a second actuator 22B. In some embodiments, the drive system is a holonomic drive system, which in the illustrated embodiment, allows the mobility platform to move omnidirectionally in three degrees of freedom, as will be discussed further with reference to FIGS. 2-3.

The tool control unit is configured to control the activation and/or motion of one or more tools mounted on the mobility platform. The tool control unit may issue one or more commands to an associated tool to perform one or more tasks. In the configuration shown in FIG. 1, the mobility platform includes a marking device 50 mounted on a carriage 52 which allows the marker to reach the extremities of the chassis 12 of the mobility platform. The tool control unit is configured to control the movement of the marking device on the carriage and deposit inks, powders, or other effective marking materials to layout a construction site according to a design file. The marking device may make marks on materials in the construction site, such as walls and floors, pillars, ceilings etc. in response to commands from the tool control unit. The carriage may position the marking device in an appropriate task location in response to commands from the tool control unit. Other commands from the tool control unit may control parameters of marking such as line thickness, color, material, etc.

As shown in FIG. 1, the mobility platform 10 includes a plurality of sensors configured to acquire and/or output information regarding the surroundings of the mobility platform so that the mobility platform may navigate autonomously without additional beacons or navigational equipment in the work site. According to the depicted embodiment, the mobility platform includes stereo camera(s) 40, an optical flow sensor 42, an inertial measurement unit 44, and a LiDAR unit 46. As will be discussed further below, the information acquired and/or output by each of the sensors may be fused by the task server 30 as the mobility platform navigates through a construction site. In some embodiments, information from at least two sensors may be averaged, selected based on conditions, compared to find errors, and/or any other appropriate operation. For example, independent local positions may be determined through inertial integration or optical flow, while global positions are generated through landmark recognition via the LiDAR unit 46 or a camera stereo pair. Comparison of these independently generated positions may allow the mobility platform to self-test positional accuracy and recalibrate one or more parameters of the task server as the mobility platform navigates the construction site. Of course, any suitable number or type of sensors may be employed and their data fused, combined, or compared to improve the accuracy and/or precision of autonomous navigation in a construction site, as the present disclosure is not so limited.

In the embodiment shown in FIG. 1, the mobility platform 10 also includes additional devices that cooperate with the task server 30 to allow the mobility platform to navigate and perform tasks autonomously in a construction site. For example, the mobility platform includes a storage device 36 such as a hard drive, solid state drive, or other memory for storing instructions or other data, as well as a wireless communicator 38 which communicates to various local or remote devices wirelessly through any appropriate communication protocol (e.g., satellite, cellular, Wi-Fi, 802.15.4, etc.). Of course, while the mobility platform of FIG. 1 communicates wirelessly, any suitable wired communication interface may also be employed, such as a wired serial port, Ethernet port, etc. The combination of the storage device and the wireless communicator enables the mobility platform to send, receive, and store data from one or more external devices, such as a remote server (i.e., cloud server) 100, remote computer 130, mobile device 140, or local workstation 110 (e.g., a portable or handheld device such as a laptop, tablet, or mobile phone, a desktop computer, or any other appropriate device which is within wireless or wired range of the mobility platform and/or network access point so that the workstation can communicate with or control the mobility platform from the construction site). Such an arrangement may allow a file served from a remote server to be analyzed by the task server to generate paths, tasks, task locations, and other relevant information that the robotic system may use to perform tasks autonomously or semi-autonomously in a work site.

As noted above, the mobility platform 10 of FIG. 1 is configured to communicate with a plurality of external devices to simplify navigating autonomously and performing one or more tasks. The external devices that communicate directly or indirectly with the mobility platform include a remote server 100, ground station 110, router 120, remote computer 130, and mobile device 140. The remote server, which may be located in a data center as part of a cloud computing service, is employed to manage the files used by the robotic system to navigate and perform tasks. That is, the remote server may coordinate file management, path generation, path correction, task planning, and any other desirable functions. In some embodiments, path correction may be coordinated onboard the mobility platform 10. The remote server allows designers, such as contractors, consultants, engineers and architects, to provide design files and task information which may be employed by the mobility platform. As will be discussed further with reference to FIG. 4, the remote server may automatically generate optimized paths for performing tasks at a variety of locations in a construction site by extracting information from a design file such as a 2D or 3D drawing or Computer Aided Design (CAD) file. Engineers, architects, or other remote workers may interface with the remote server from industry-standard file management platforms, or via web interface where files are uploaded, either of which may be on the mobile device 140 or remote computer 130. A mobile device graphical user interface 142 or a remote computer graphical user interface 132 may be used to transmit or download files from the remote server and modify files using CAD or Building Information Management (BIM) software platforms. The file management system employed on the remote server may include a database for storage of drawings, plans, and relevant data, and may also be fitted to provide users with modification history of files in store. The remote server also enables contractors, tradesmen, or other workers locally available at the construction site to provide feedback to paths, task locations, or control parameters. In particular, the remote server may communicate with the ground station having a ground station graphical user interface 112. The ground station graphical user interface may allow an operator to confirm, modify, or deny navigation and task plans generated by the remote server onsite before the mobility platform begins operating autonomously. In some cases, the ground station may also be used to manually override or manually control the mobility platform. According to the embodiment of FIG. 1, the router 120 may be configured as a modem, satellite, cellular tower, or other suitable interface suitable to coordinate data transmissions between the remote server, mobility platform, and/or ground station.

It should be noted that while a remote server 100 is shown and described with reference to FIG. 1, any appropriate server or processor may be used, including servers and processors located locally (e.g., onboard the mobility platform) or in close proximity to a work site, as the present disclosure is not so limited.

Figure 2:
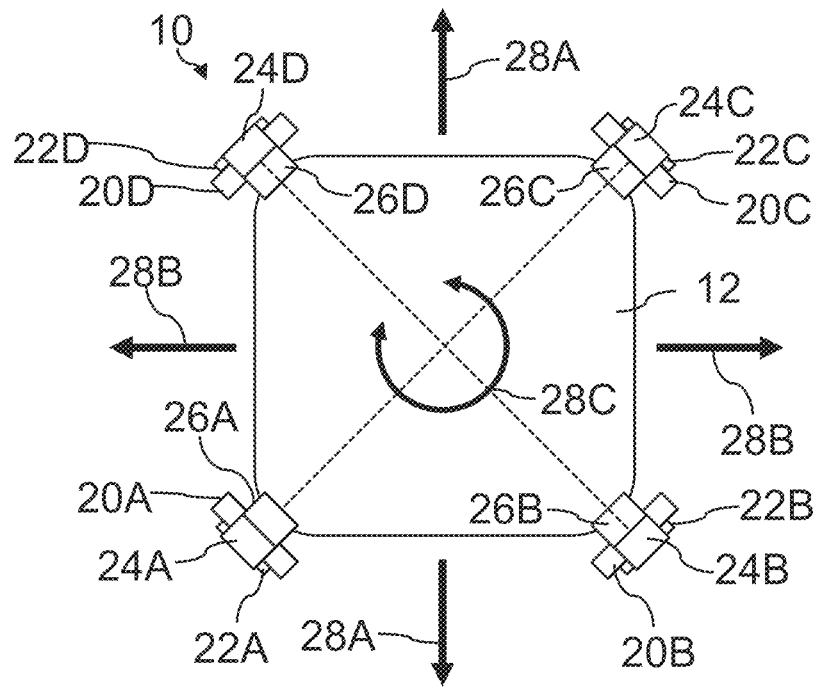
FIG. 2 is a top schematic view of an exemplary embodiment of a mobility platform chassis in a first position.

FIG. 2 is a top schematic view of one embodiment of a mobility platform 10 including a holonomic drive system enabling the mobility platform to move in three degrees of freedom and reach the extremities of a construction site. The holonomic drive system allows the robotic system to position a tool mounted on the mobility platform in a region flush with an extremity of a construction site, such as a corner, which may otherwise necessitate multiple movements to reach or be inaccessible. The holonomic drive system of FIG. 2 includes four wheels 20A, 20B, 20C, 20D, each of which are coupled to a respective actuator 22A, 22B, 22C, 22D. Each of the four wheels rotates about an independently controlled axis which allows the wheels to be angled relative to a chassis 12 of the mobility platform. That is, each of the wheels and their respective actuators is coupled to the chassis 12 via an axis actuator 26A, 26B, 26C, 26D, each of which is configured as a servo motor coupled to a respective wheel support 24A, 24B, 24C, 24D. The axis actuators allow the axis of each of the wheels to be adjusted (i.e., swiveled) independently, so that the mobility platform may move freely in three degrees of freedom. This arrangement provides complete motion flexibility in 2D plane environments and enables execution of very complex motion patterns for the accomplishment of certain tasks. Of course, while independently rotatable wheels are shown in FIG. 2, any suitable holonomic drive system may be employed such as omnidirectional wheels.

According to the embodiment of FIG. 2, the mobility platform 10 provides a robust chassis 12 for mounting a variety of tools or payloads. The chassis 12 is configured as two flat plates secured to one another via the axis actuators 26A, 26B, 26C, 26D and other supports not shown in the figure. The chassis has a plurality of hard mounting points which allow tools or payloads to be mounted modularly to the mobility platform. Of course, while the chassis of FIG. 2 is configured as two flat plates, any suitable shape and arrangement of the chassis may be employed, as the present disclosure is not so limited.

Figure 3:
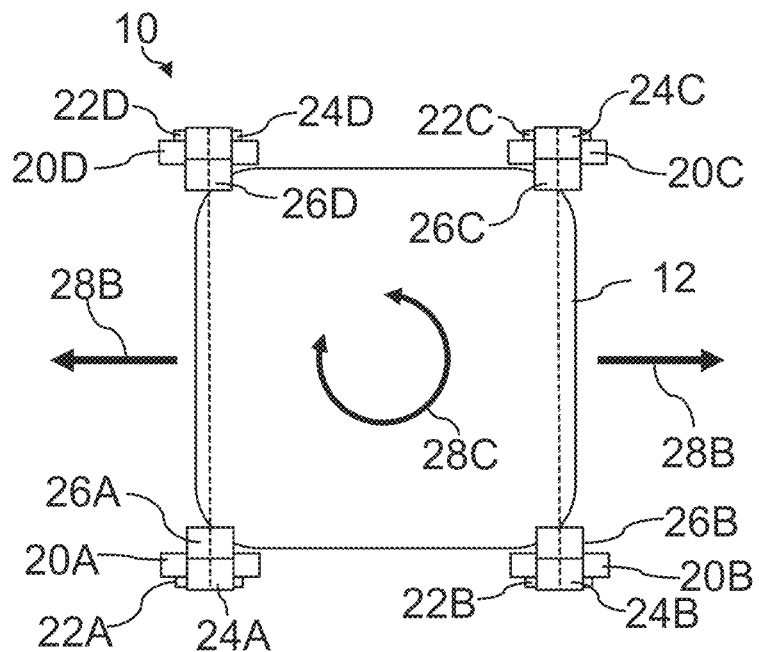
FIG. 3 is a top schematic view of the mobility platform of FIG. 2 in a second position.

FIG. 2 is a top schematic view of the mobility platform 10 in a first position, and FIG. 3 is a top schematic view of the mobility platform in a second position which show the degrees of freedom provided by the holonomic drive system. As shown in FIG. 2, the holonomic drive system is shown in the first position, where the axes of rotation for the first wheel 20A and the third wheel 20C are aligned, and the axes of rotation for the second wheel 20B and the fourth wheel 20D are aligned and perpendicular to the axes of the first and third wheels. In the configuration shown in FIG. 2, the mobility platform is capable of moving in three degrees of freedom by varying direction of rotation of the wheels about their various axes of rotation, or varying the axes of rotation of the wheels themselves. The holonomic drive system is capable of moving the mobility platform along a first axis 28A, a second axis 28B perpendicular to the first axis, and also change the orientation of the mobility platform about a third axis 28C. As shown in FIG. 3, the wheels have been rotated to facilitate movement of the mobility platform along the second axis 28B. That is, each of the axes of rotation of the wheels has been moved by the respective axis actuator, so that the first wheel 20A is aligned with the further wheel 20D, the second wheel 20B is aligned with the third wheel 20C, and the axes are parallel to one another. To reach the state shown in FIG. 3, a drive system unit of a task server may have generated commands that specify which wheel axis to rotate and the magnitude of the desired rotation. Alternatively, a task server may generate a task command which specifies a desired location and the motion control unit may generate corresponding commands to each of the wheel actuators and axis actuators to control the mobility platform to that location. Of course, the task server, motion control unit, or any other suitable processor or control unit may use any suitable task command to control the motion of the mobility platform, including combinations of the task commands described above, as the present disclosure is not so limited. Accordingly, the mobility platform may move easily along the second axis, or may rotate about the third axis 28C. Similarly, the wheels may be rotated to facilitate movement of the mobility platform along the first axis 28A shown in FIG. 2. The axes of the wheels may be adjusted without moving the mobility platform itself from an initial position, allowing the mobility platform to be moved in any of the three degrees of freedom from an initial position. For example, one or more axis actuators may adjust the axes of the wheels upon command from a motion control unit.

Figure 4:
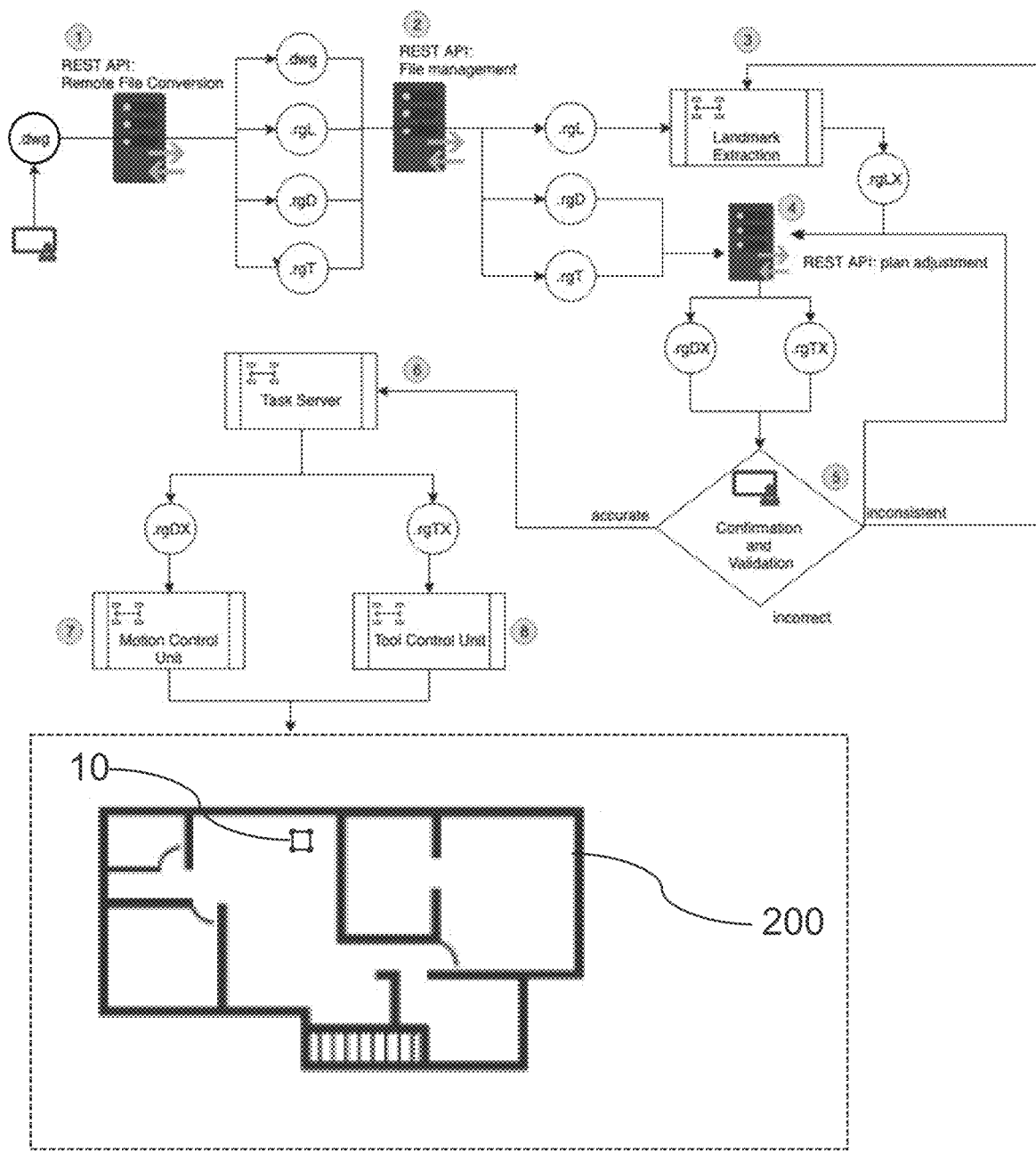
FIG. 4 is a functional block diagram of an exemplary embodiment of a system and method for operating a mobility platform in a construction site.

FIG. 4 depicts a functional block diagram for one embodiment of a system method for operating a mobility platform 10 in a construction site 200. As noted previously, many activities performed on construction sites may be defined by architectural and engineering designs. These designs are created by architects, engineers and contractors and are captured in electronic files (i.e., design files). The design files may be stored in industry-standard formats including CAD drawings, BIM models, and other digital formats (e.g., .dxf, .dwg, .rvt, .nwd, .ifc, etc.), which are compiled, managed and distributed via local or remote file management systems, such as the remote server 100 of FIG. 1. According to the process shown in FIG. 4, the remote server and mobility platform of exemplary embodiments described herein converts design files into real-world actions and tangible work by the mobility platform. The method of FIG. 4 beings with converting a standardized file (1), such as a .dwg file, received at a remote server. The file may be received by a manual upload, or a direct connection with an existing file management system. Upon receipt of the file, the remote server processes the standard format design file and generates relevant information from the design, generating three main files that will be used by the mobility platform: landmark files (.rgL) containing navigation information for landmark extraction of relevant features of the environment used for design validation and indoor navigation without need of installed sensors or beacons, drive files (.rgD) determining the mobility platform's planned path to be executed on site during operation, and tool files (.rgT) determining the sequence, parameters and operation definitions of supported tools. The method next includes storing all three proprietary files and a copy of the original file on the remote server so that the files are accessible to one or more remote users.

In some embodiments, rather than converting the standard file into three main files, the standard file may be broken into two files used by the mobility platform. One file may be a feature file (.rgF) containing navigation information of relevant features of the environment used for design validation and indoor navigation without need of installed sensors or beacons. The other file may be a task file (.rgT) determining both the mobility platform's planned path to be executed on site during operation and the sequence, parameters and operation definitions of supported tools. These proprietary files may be stored on the remote server so that the files are accessible to one or more remote users.

In a representative method of using a system as described above, the on-site deployment of the mobility platform 10 may begin when the mobility platform is placed on a desired construction site and powered on. The operator then initiates the execution of a task locally (e.g., with a switch on the mobility platform), at a ground station, or remotely. Upon the operator's command to execute a task, the mobility platform may recall from internal or external memory or submit a request to the ground station or file management service (2) and downloads the necessary command files. The mobility platform then carries out a landmark extraction procedure (3) and uses the information in the files to identify known features (that reliably exist both in the design and the construction site), identify unknown features (that exist in the construction site but not in the design), establish its global coordinate system of reference, and perform initial tuning of its control system. For example, the mobility platform may use one or more sensors to detect one or more features (e.g., control points and lines, structural elements, floor penetrations, etc.) in the construction site and match that identified feature to one noted in the task command files. The landmark extraction procedure includes the execution of the motion plan predetermined in the landmark data system file (.rgL), or, in some embodiments, a feature data system file (.rgF). During the execution of the landmark data system file, the sensors on the mobility platform collect data and characterize the landmarks from the real floor plan conditions. At the end of the landmark extraction procedure, the mobility platform will have collected and characterized the floor plan as well as performed calibration of sensors by comparing its own odometry readings with control points or other identified known features or landmarks. The extracted landmark file will be modified into a final extracted landmark file (.rgLX) based on the feedback from the mobility platform sensors and is submitted to a human operator for approval, modification, or rejection.

Once the feature identification process is completed, the extracted landmark file is submitted to the remote server which adjusts the drive and tool files (4) based on the as-is condition of the job site as recognized by the sensors of the mobility platform 10. The plan adjustment procedure compares landmarks positions and signatures from the extracted landmark file (.rgLX) with the original landmark data file (.rgL). The comparison is done in two steps: matching and correcting. In the matching step, the remote server recognizes the coordinate system adopted by the extracted landmark file based on the initial position of the mobility platform on the floor plan, which may or may not be different to the one used in the drive system landmark data file. In cases where the coordinate systems are different, the remote server matches the data generated by the mobility platform to the original landmark file. Next, in the correcting step the remote server solves for a transformation function that maps the landmark data system to the generated landmark data. In addition, the remote server identifies any discrepancies between those files, such as landmark orientation, position and location and defines adjustment parameters to be used in other plans.

The remote server creates the adjusted drive files (.rgDX) and adjusted tool files (.rgTX) and transmits them for confirmation and approval of operator(s). A control station (e.g., a remote computer, ground station, etc.) prompts (5) the operator(s) for confirmation and validation of the adjusted path. The validation step may be deemed accurate, inconsistent or incorrect by the operator, and the transformation function and the relative errors found in the drive and tool file adjustment step may be displayed in a graphic interface on the control station for the operator. If the operator deems the adjusted files accurate, the modified drive and tool files are acceptable to the operator and performance of the instructions in the files by the mobility platform will create the desired work product. If the operator deems the adjusted files inconsistent, the operator identifies areas in which the plan adjustment is faulty, such as when landmarks identified in the plan are correct, but the adjusted base drive and/or tool plans are dissimilar. In this case, the operator can tweak adjustment parameters using a graphical user interface of the control station, including recalculating the transformation function and adjustment parameters. If the operator deems the adjusted files incorrect, the operator identifies where the landmark extraction yielded incorrect landmarks, which may be caused by faulty, or interrupted, landmark extraction process. If the adjusted files are incorrect, the operator may command the mobility platform to perform the landmark extraction procedure (3) again and readjust the extracted landmark file. When the adjustment is deemed accurate and confirmed, the adjustment parameters and transformation functions are applied to the drive system and tool system data files, generating corrected drive and tool system data files (.rgDX and .rgTX, respectively) containing information suitable for generating a navigation path for the mobility platform. For example, the corrected drive and tool system data files may include corrected locations of one or more tasks to perform with tools, the corrected location of one or more landmarks, or other suitable information. For example, in some embodiments, a corrected drive and tool system data file may include trajectory segments for the mobility platform characterized by one or more of initial position and velocity, final position and velocity, as well as tool action and task locations. The corrected drive and tool system data file may also include information relating to how the mobility platform should be controlled based on the tasks being performed or lack thereof. That is, the corrected drive and tool system data file may include an indicator or other information that the mobility platform should be tightly controlled to a segment (e.g., while marking a floor plan), or an indicator that mobility platform may be loosely controlled (e.g., while traversing between points without executing any tasks). The remote server then sends the corrected drive and tool files to a task server of the mobility platform for execution.

In some embodiments, the mobility platform may not perform a landmark extraction process. Rather, the mobility platform may receive and attempt to execute the drive files (.rgD) and tool files (.rgT) while making minor navigational adjustments on the fly. That is, the mobility platform may employ data from one or more sensors to avoid smaller unexpected obstacles without significantly deviating from a path as specified in the overall drive files and tool files provided to the mobility platform. In some embodiments, the mobility platform may request the ground station to plan a route deviation to navigate around a larger obstacle that may be detected by the mobility platform. In some embodiments, the mobility platform may provide a notification to a user that the detected landmarks do not match the expected landmarks, so that the landmark files, drive files, and tool files may be re-planned at the remote server or ground station level.

As shown in FIG. 4, when the final corrected drive and tool plans are accepted by the operator the remote server transmits the corrected files to the task server disposed on the mobility platform (6). The task server is the main embedded software application responsible for executing validated tasks. The task server orchestrates the actions of the motion control unit and the tool control unit. The corrected drive files (.rgDX) are transmitted to and interpreted by the motion control unit (7), while the corrected tool files (.rgTX) are transmitted to and interpreted by the tool control unit (8). The motion control unit (7) includes the software applications responsible for the locomotion of the mobility platform including sensor drivers and data processing units, power management and motion control units, filters, etc. Additionally, the motion control unit is responsible for managing path execution and obstacle avoidance. Accordingly, the motion control unit interprets the corrected drive files received from the remote server and executes a series of instructions therein to move the mobility platform along a path to perform a series of tasks. The tool control unit comprises the set of software components used in the operation of tools carried by the mobility platform for the task it is configured to perform. The tool control system controls fine-tune positioning and use of attachments through the control of actuators, motors, solenoids, compressors, pumps, presses, and/or any other suitable actuator.

The functional block diagram of FIG. 4 depicts a system for performing a plurality of different functions as described above. In some embodiments, some of the functions described above may be performed by distinct components, while other functions are performed by the same components. In some cases, the computations and functions described may be handled by different components of the exemplary system. In some embodiments, computationally expensive or non-time sensitive processes may be performed by a remote server. For example, generation of the landmark files, drive files, and tool files may be performed by the remote server. Correspondingly, computationally inexpensive or time-sensitive computation may be handled onboard the mobility platform. For example, minor course adjustments based on sensor data and low-level control of the mobility components (e.g., motors, wheels, etc.) may be performed onboard the mobility platform. Mid-level adjustments that may be less time-sensitive or slightly too computationally expensive for the mobility platform may be performed by a control station (e.g., ground station). For example, large course adjustments to the drive and tool files may be performed by the control station. Of course, any suitable number and type of appropriate components may be employed to perform the functions shown in FIG. 4, as the present disclosure is not so limited.

According to the functional block diagram of FIG. 4, specific communications between various components are shown. However any of a mobility platform, remote server, ground station, remote computer, or mobile device may communicate with one another directly or indirectly for either automatic adjustments to the drive and tool files, or manual interventions to adjust the drive and tool files to address discrepancies that may exist between the work site and the various files. Accordingly, the present disclosure is not limited in this regard.

Figure 5A:
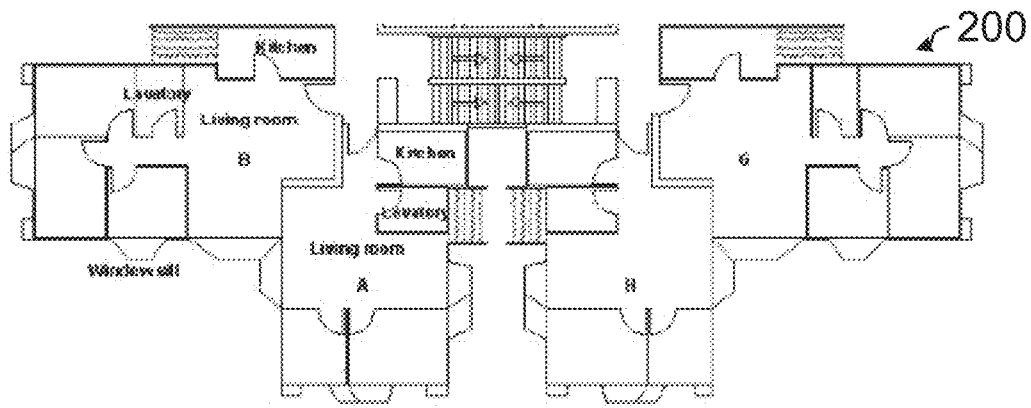
FIG. 5A is a graphical representation of an exemplary embodiment of a design file of a construction site.

FIG. 5A depicts a graphical representation of data that may be included in a design file 200 of a construction site. In general, the design and construction industries use standard file formats to exchange information (including but not limited to .rvt, .dwg, .pdf, etc.). These files may include 2D or 3D coordinate data of one or more features of the existing or planned construction site. As shown in FIG. 5A, the file is a 2D model of a floor plan of a high-rise building. According to exemplary embodiments described herein, a remote server may expose API(s) that receive files in these, extract relevant information and converts the extracted data into the three possible categories according to their relevance to subprocesses: landmark data (.rgL), drive system data (.rgD) and tool system data (.rgT). To extract the relevant landmark data from the design file, the remote server or another processor may employ machine learning or another appropriate technique to recognize shapes in the design file and tag the shapes as potential landmark candidates. The drive and tool system data may be generated based on the design file and task specific information. For example, in the case of marking tasks, the remote server or processor may identify the locations of walls as features that will be marked, and that information will be incorporated into the drive and tool system data. Landmark data is used to enable, assist and/or improve the navigation of the mobility platform without the need of global positioning or beacon system. Information relevant to the landmark extraction consists of data sets that can unequivocally characterize the environment. For example, landmarks which may be identified include, but are not limited to, control points or control lines used by contractors, structural elements such as columns, elevator shafts, or load bearing balls, and/or or any other architectural or engineering features available at the time of operation. In some embodiments, the remote server may employ pattern, shape, or character recognition to identify elements in the design file which may be suitable landmarks for use in navigating a mobility platform. In addition to landmark data, the remote server may also extract boundary or constraint information which defines an outer envelope of operation for the mobility platform when navigating the construction site. These constraints may be based on a combination of the landmarks identified and the location of one or more tasks to be performed by the mobility platform.

Figure 5B:
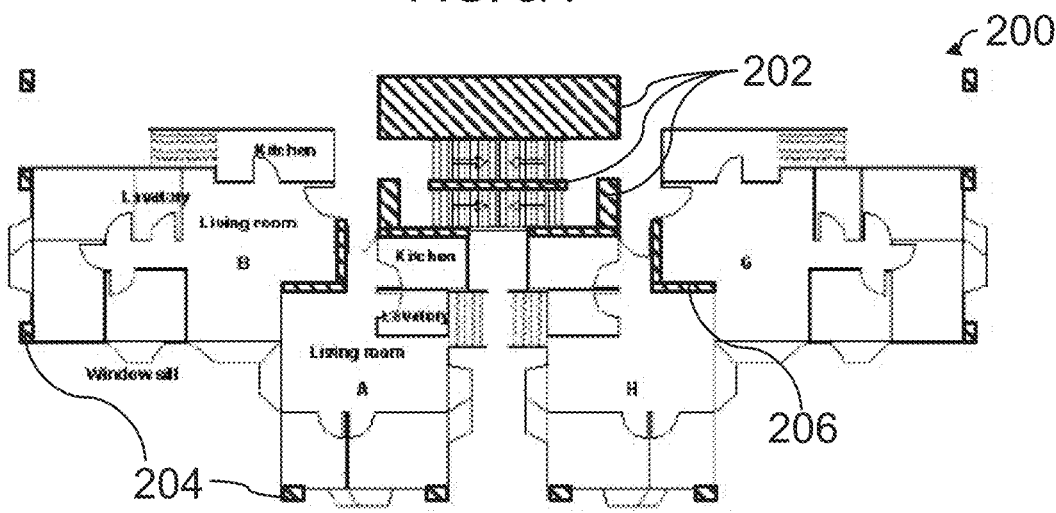
FIG. 5B is a graphical representation of an exemplary embodiment of landmarks extracted from the design file of FIG. 5A.

FIG. 5B depicts one embodiment of landmarks extracted from the design file 200 of FIG. 5A. According to the embodiment of FIG. 5B, the landmarks include structural elements or other features of the work site, which are likely to be in place prior to use of a mobility platform. In particular, the remote server identifies a stairwell 202, columns 204, and load bearing walls 206. These elements in the floor plan model serve as reference points to a motion control unit of the mobility platform. The landmark extraction process may also identify differences between the as-is work site and a design file, so that one or more tasks and task locations may be identified based on the identified landmarks. As will be discussed further with reference to FIGS. 6A-6B, the identified landmarks may at least partly determine a path for the mobility platform which maximizes the number of landmarks within range of sensors deployed on the mobility platform to increase accuracy of the motion control unit. In some embodiments, the remote server may also extract one or more control points placed on the floor which may be used by the mobility platform for calibration points as the motion control unit executes a path. In many cases, control points are conventionally employed in the construction industry for positioning and referencing purposes during the construction process, meaning no additional placement of beacons or markers in the construction site may be needed to successfully navigate the construction site. Thus, the landmark system data extracted from a design file contains the positions and signatures of all the relevant landmarks that will be used to identify features in the environment, the position and identification of all control points used during navigation as well as a path to be executed by the mobility platform on site to perform the identification procedure.

Figure 5C:
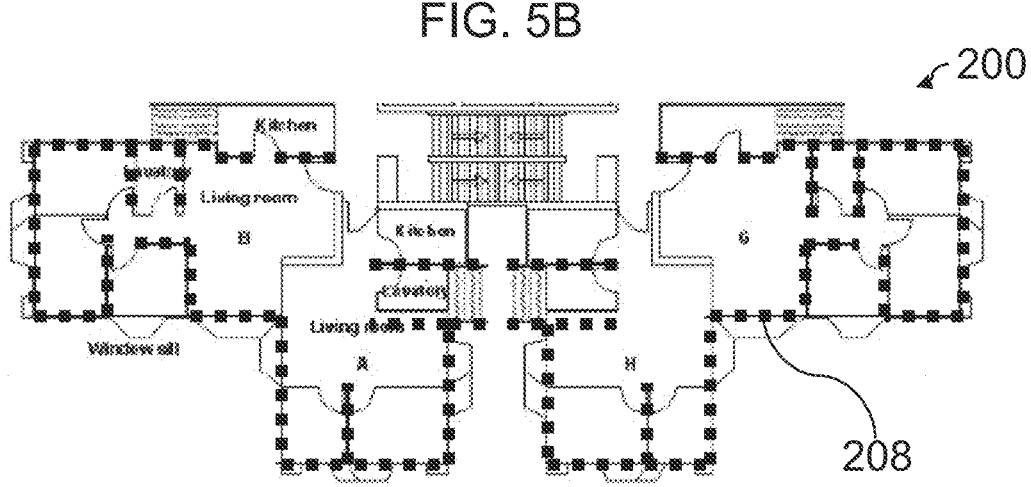
FIG. 5C is a graphical representation of an exemplary embodiment of constraints for at least one tool extracted from the design file.

FIG. 5C depicts one embodiment of constraints 208 for at least one tool extracted from the design file 200. The motion constraints on the platform are determined by the actions required by each tool operation. These constraints are extracted from the floor plans by a remote server and provide the exact positions at which the mobility platform must deliver its tools. According to the constraints shown in FIG. 5C, the mobility platform may be configured with a marking device and configured to trace a layout of a construction site. The constraints show the correct position of the tool tip at several points in space which is taken into account when planning a path of a mobility platform to optimize navigational accuracy and task completion efficiency. In some cases, the constraints or tasks may be directly embedded in the design file or, in some embodiments, the remote server generates suggested tasks and tool constraints based on a particular 3D or 2D design file, as the present disclosure is not so limited.

Figure 6A:
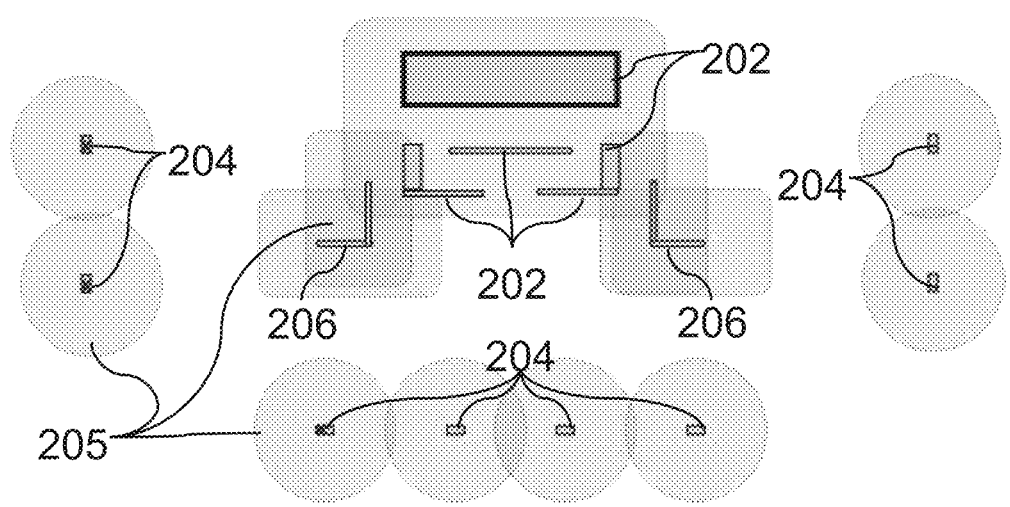
FIG. 6A is a graphical representation of an exemplary embodiment of landmark areas of influence employed in some embodiments of a path optimization method for a mobility platform navigating in a construction site.

Conventional autonomous navigation systems on a small scale that are independent of human control rely on limited amounts of information which yields drift and inaccuracies in navigation over time. In contrast, the mobility platform of exemplary embodiments herein employs at least two sensors and generates a path for completing tasks which increases the available data for conforming to that path accurately with reduced drift by selecting path segments which are in sensor range of an established landmark. A schematic of the method used for optimizing the path is shown in FIG. 6A, which depicts the extracted landmarks 202, 204, 206 of FIG. 5B with assigned landmark areas of influence 205. As noted previously, a remote server may generate a drive system data file (.rgD) from a design file which contains the information extracted from the drawings relevant to the trajectory executed by the mobility platform during operation. This trajectory is determined by motion planning algorithm that performs path optimization while satisfying tool-specific position constraints, which may be run on a remote server or onboard a mobility platform. The optimization algorithm maximizes the accuracy of the navigation system by increasing the available information to one or more sensors onboard the mobility platform. In particular, the path optimization routes the path through the landmark areas of influence. That is, based on the landmarks identified in the landmark extraction step and the parameters of onboard sensors and/or the effective range of the sensors onboard the mobility platform, the remote server and/or mobility platform identify the shape, size, and position of the landmark areas of influence. The path planning algorithm calculates the trajectory of the mobility platform in the construction site while ensuring that it satisfies the position constraints on the floor plan while optimizing the availability of landmarks for its navigation system to orient itself from. The path planning algorithm may be executed on the remote server based on the information from the design file and the landmark extraction. Alternatively or additionally, the path planning algorithm may also be executed onboard the mobility platform, as the present disclosure is not so limited.

In some embodiments, a path may be generated based on a projected position accuracy arising from navigation based on a comparison of perceived continuous displacement and perceived location based on the location of one or more landmarks. Path generation may entail generation of multiple candidate paths and assigning a cost to each such that a low cost path may be selected. A cost function may be used to assign costs to candidate paths generated for the mobility platform. Candidate paths for which larger positional errors are possible may be assigned a higher cost by the cost function.

The cost function may take into account variables relating segments of the path to positional accuracy, such as distance of the path segment from one or more landmarks, sensor range, and sensor accuracy to compute a positional error for the mobility platform. Path segments that rely more exclusively on continuous local positioning (e.g., from drive encoders, optical flow sensors, etc.), for example, may be assigned a higher cost than a comparable length segment that allows global position to be determined based on the one or more recognizable landmarks (e.g., via LiDAR, stereo camera, mono camera, etc.). Alternatively or additionally, other parameters may be used in the cost function, such as parameters that indicate efficiency in completing the path, which may be based on a time required for the mobility platform to traverse the path. In some embodiments, the cost function assigns values based on the projected error in measurements provided by one or more sensors employed on a mobility platform over the course of executing the path, as well as the relative benefit of the efficiency and speed of the mobility platform completing the path. Costs may be assigned to various segments of a candidate path and aggregated to a total cost of the candidate path based on this cost function. Accordingly, as potential paths are iteratively generated, paths with lower overall cost may be selected and ultimately provided to a mobility platform to execute.

Figure 6B:
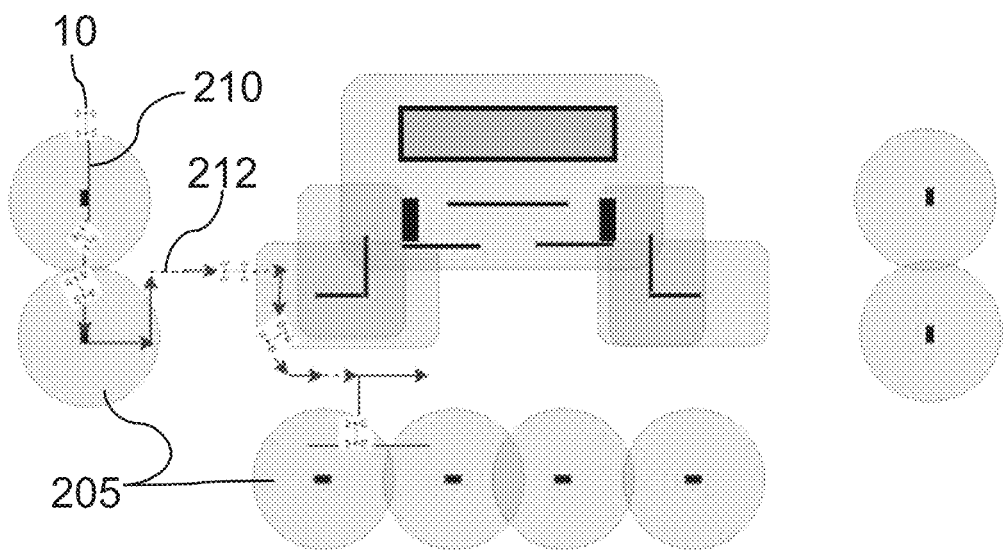
FIG. 6B is a graphical representation of an exemplary embodiment of a path generated for a mobility platform based on the landmark areas of influence of FIG. 6A.

In some embodiments, path segments that are within sensor range of a landmark may be relatively low cost per unit length in comparison to path segments that are out of sensor range of a landmark such that navigation is based on local positioning (e.g., from drive encoders, optical flow sensors, etc.). Accordingly, generating a path to provide high projected positional accuracy may include iteratively adjusting the path to increase an amount of the path disposed within a threshold distance of one or more landmarks. An exemplary path generated by such a path generation process is shown in FIG. 6B. In some embodiments, optimizing a generated path may include providing a path employing continuous displacement to navigate to the location of a task away from one or more landmarks, and then returning toward the one or more landmarks once the task is completed.

Once the path is optimized to increase the availability of landmark information, the mobility platform 10 navigates the optimized path 212 as shown in FIG. 6B. As noted previously, the mobility platform may read and execute a drive system data file (.rgD, .rgDX) including the optimized path which a motion control unit may use to move the mobility platform. The mobility platform may also read and execute a tool system data file (.rgT, .rgTX) which includes lists of actions and tool-specific configurations associated with locations across the floor plan. The tool system data file may be used by a tool control unit to operate one or more tools to perform tasks in assigned locations along the optimized path, such as marking, drilling, hauling, hammering, etc.

Figure 7:
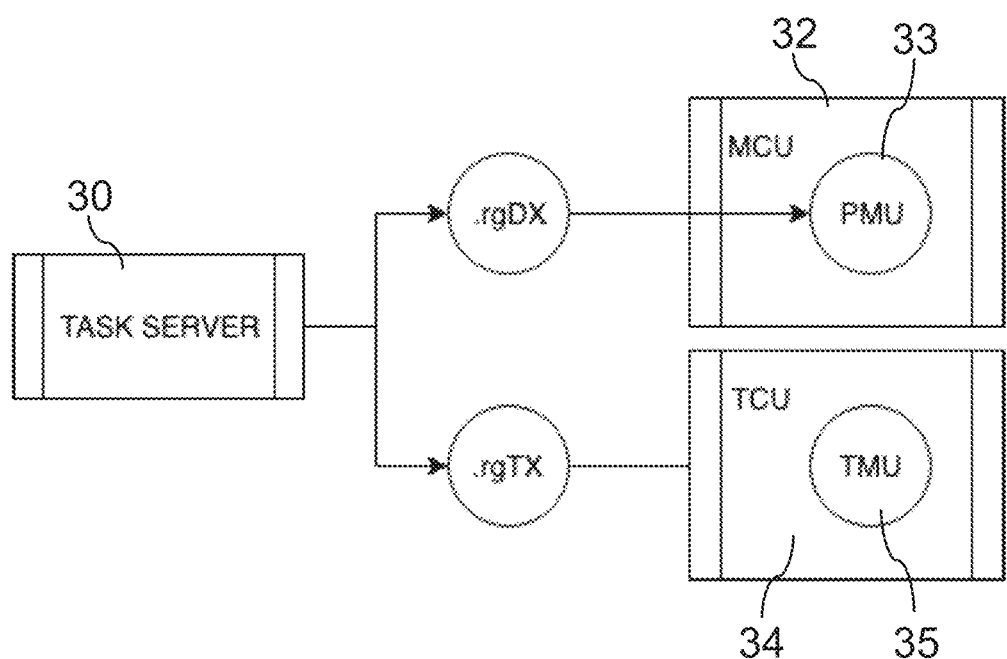
FIG. 7 is a schematic of an exemplary embodiment of a task server, a mobility control unit, and a tool control unit of a mobility platform.

FIG. 7 depicts an enlarged schematic of one embodiment of a task server 30 of a mobility platform including a motion control unit (MCU) 32 and a tool control unit (TCU) 34. According to the embodiment of FIG. 7, the task server unit is the software application executed by a controller, processor, microprocessor, or other suitable device which coordinates the action of MCU and the TCU. As noted previously corrected drive system files are received by the task server from a remote server. These corrected drive system files are routed in the form of trajectory commands to a path management unit (PMU) 33 of the MCU, the functionality of which will be described further with reference to FIG. 8. Meanwhile, corrected tool system files are received by the task server from the remote server and routed in the form of task commands to a tool management unit (TMU) 35 of the TCU. The TMU holds information regarding both tasks to be performed by various tools and the task locations and provides that information to the TCU. The TCU executes the commands to perform the tasks along the optimized path. The TCU listens to combined odometry readings from the sensor fusion unit and/or time steps from the MCU. At every timestep of the task server control algorithm, the current position of the mobility platform is compared to a list of location-based commands. If a tool action is defined at this location, a tool control command is sent to the tool control unit from the task server to execute that command. Thus, the task server coordinates the execution of commands of the MCU and TCU in time and space so that the mobility platform may reliably navigate and perform tasks in a construction site.

Figure 8:
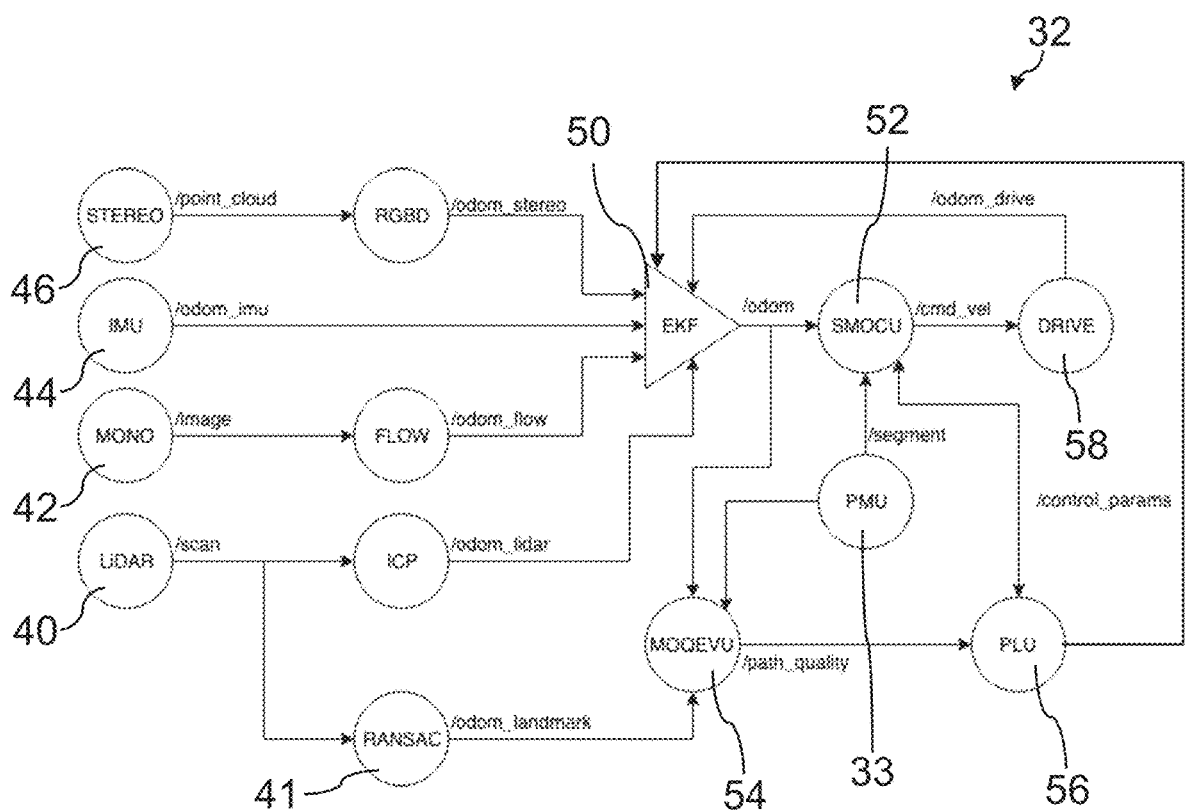
FIG. 8 is a schematic of an exemplary embodiment of a motion control unit for controlling a mobility platform along a path.

FIG. 8 depicts one embodiment of a block diagram for a motion control unit (MCU) 32 moving a mobility platform along a path. As discussed previously, the motion control unit is an embedded software network responsible for controlling the position and orientation (i.e., pose) of the robotic system in a construction site and employs a wide range of sensors to perceive its position in the work site. The operation of the MCU is triggered by a command (i.e., received from a task server or coordinating controller) to execute a given trajectory. These trajectory commands are received by a path management unit (PMU) 33 and consist of a series of positions in space that need to be reached in sequence. For every position in the trajectory command, the PMU creates a segment command message and sends it to a segment motion control unit (SMOCU) 52. The SMOCU is fed combined odometry information and calculates velocity commands that are sent to a drive system 58 to move the mobility platform. In some embodiments, the SMOCU implements one selected from the group of a proportional (P), proportional-integral (PI), proportional-differential (PD), proportional-integral-differential (PID), or proportional-integral-velocity (PIV) controller characterized by the constants (Kpp, Kpi, Kvp, Kvi). Of course, the SMOCU may implement any suitable controller, such as a fuzzy logic controller, as the present disclosure is not so limited. According to the embodiment of FIG. 9, the combined odometry information used by the SMOCU is generated from the sensor fusion of odometry signals from a stereo camera 46, inertial measurement unit 44, optical flow sensor 42 (i.e., a mono camera), and LiDAR unit 40 all of which are fed through an extended Kalman filter (EKF) 50 and passed to the SMOCU. While an EKF is shown in FIG. 8, any suitable filter may be employed, such as a particle filter, as the present disclosure is not so limited. Of course, any suitable sensor may be employed to provide information to the MCU (e.g., wheel rotary encoders, image recognition, etc.), and the information fused with that of other sensors using any appropriate sensor fusion technique.

As shown in FIG. 8, the LiDAR unit 40 also feeds a Motion Quality Evaluation Unit (MOQEVU) 54 which constantly evaluates the accuracy of the executed motion segment and provides motion quality data output. To do so, the MOQEVU compares the high-frequency combined odometry signal integration from EKF 50 with low-frequency landmark comparison routines 41. That is, the position determined from high frequency sensors like the optical flow sensor 42, inertial measurement unit 44, and stereo camera 46 is compared with a position independently determined from landmark recognition by the LiDAR unit or additional stereo cameras. In this manner, the higher the correlation between the integration of the odometry with the landmark comparisons, the higher the quality of the motion system. This motion quality evaluation value is sent to a path learning unit (PLU) 56. Each tuple (motion segment and motion quality data) received is associated to a set of controller parameters in the PLU. The adjustment of the parameters in the PLU modifies the output of the SMOCU to the drive system. In this manner, the learning unit is capable of dynamically finding correlations between segment types to improve the set of motion controller parameters for each executed segment. In some embodiments, the information in each tuple may be used to change the weights used in the sensor fusion process inside of the EKF or other filter. That is, one or more signal quality thresholds inside the EKF may be used to determine exclusion of any given data point within a signal, and altering these thresholds may emphasize selected sensors along a given segment of the path. For example, a LiDAR sensor, which is highly precise while the mobility platform is traveling in straight lines, may be less precise when the mobility platform is rotating. According to this example, the signal quality threshold of the LiDAR may be increased in straight lines and decreased along turns.

Figure 9:
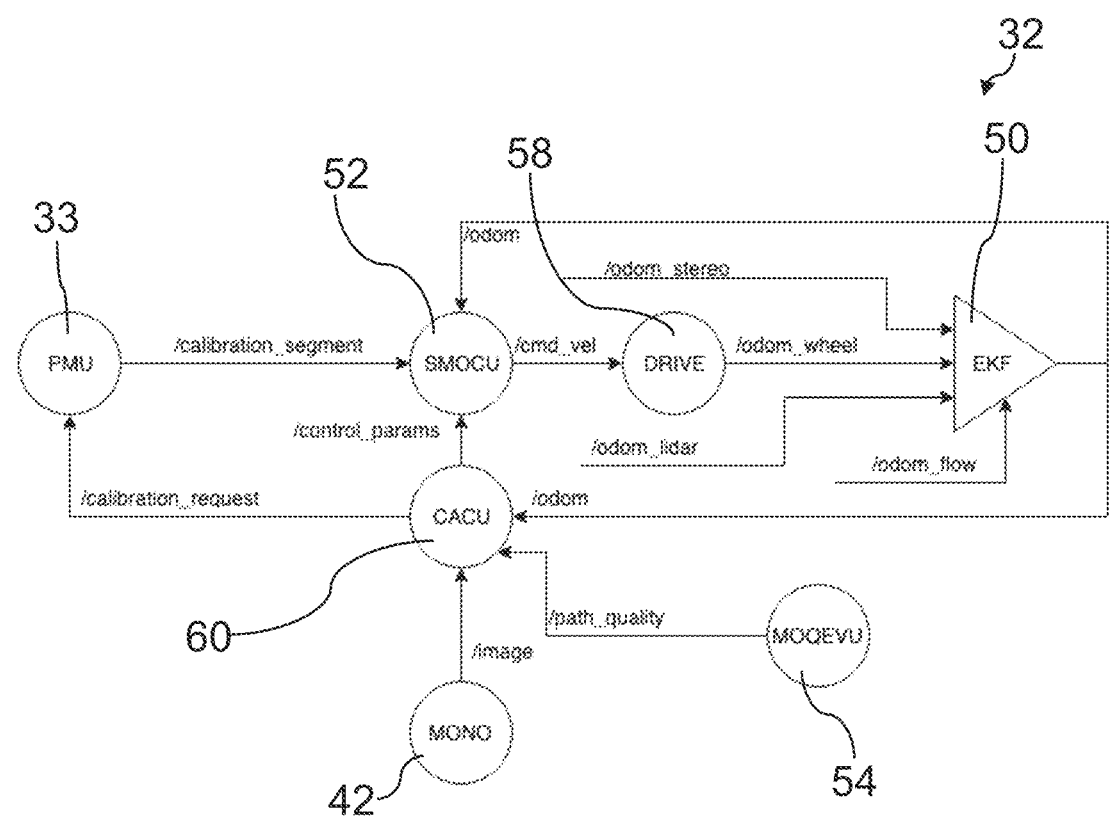
FIG. 9 is a schematic of an exemplary embodiment of a motion control unit for calibrating one or more sensors of a mobility platform.

FIG. 9 depicts one embodiment of a motion control unit 32 calibrating one or more sensors of a mobility platform. That is, in addition to the optimization of landmarks, the path planning algorithm also includes planned or unplanned calibration steps in which the mobility platform may use existing control points on the floor plan to verify its position estimation accuracy and recalibrate one or more parameters of the motion control unit, if necessary. In the embodiment of FIG. 9, the calibration process algorithm is executed at predetermined steps in the drive system data file but may also be triggered by the motion quality evaluation unit (MOQEVU) 54. A calibration control unit (CACU) 60 listens to path quality messages broadcasted by the MOQEVU. Whenever the position accuracy value of the system falls below a predetermined threshold value, the CACU may send a calibration request to a path management unit 33 which initiated the execution of a calibration segment. In some embodiments, the calibration segment is a segment directing the mobility platform to the nearest control point. When the mobility platform reaches the targeted control point, a downward facing camera, such as a mono camera 42, verifies the position of the mobility platform relative to the control point and the CACU compares the position of the mobility platform generated through sensor odometry with the actual stored position of the target control point. In this manner, CACU may produce a set of adjusted control parameters that are sent to a segment motion control unit (SMOCU) 52 for improved accuracy in navigation when the SMOCU commands a drive system 58 to move the mobility platform.

Figure 10:
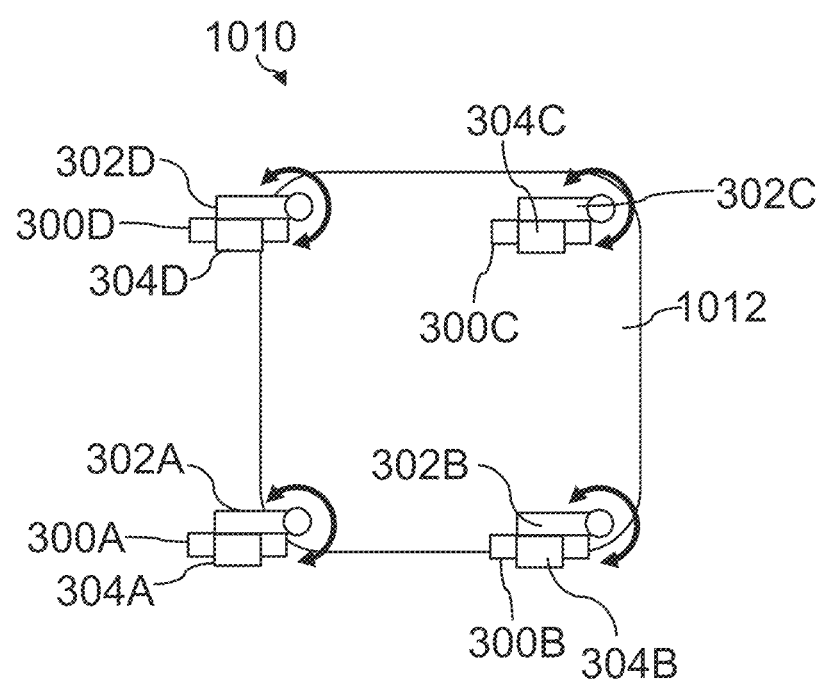
FIG. 10 is a top schematic view of another exemplary embodiment of a mobility platform chassis.

FIG. 10 is a top schematic view of another embodiment of a mobility platform 1010 including a holonomic drive system enabling the mobility platform to move in any direction in a 2D plane and reach the extremities of a construction site. The holonomic drive system allows the robotic system to position a tool mounted on the mobility platform in a region flush with an extremity of a construction site, such as a corner, which may otherwise necessitate multiple movements to reach or be inaccessible. The holonomic drive system of FIG. 10 includes four wheels 300A, 300B, 300C, 300D, each of which are coupled to a respective actuator 304A, 304B, 304C, 304D. Each of the four wheels rotates on an independently rotatable wheel support 302A, 302B, 302C, 302D. Each of the wheels and their respective actuators is coupled to the chassis 1012 via rotatable wheel supports 302A, 302B, 302C, 302D. Each of the wheel supports is coupled to an axis actuator (for example, see FIGS. 2-3) that is configured to adjust (i.e., swivel) the axis of each of the wheels independently 360 degrees so that the mobility platform may move freely in three degrees of freedom. This arrangement provides complete motion flexibility in 2D plane environments and enables execution of very complex motion patterns for the accomplishment of certain tasks. Furthermore, the arrangement of FIG. 10 ensures that drive encoders may be employed to assist in a determination of position of the mobility platform. As the wheels independently swivel, slip between a wheel and an underlying surface may be avoided, thereby improving accuracy of a drive encoder for calculating position.

Figure 11:
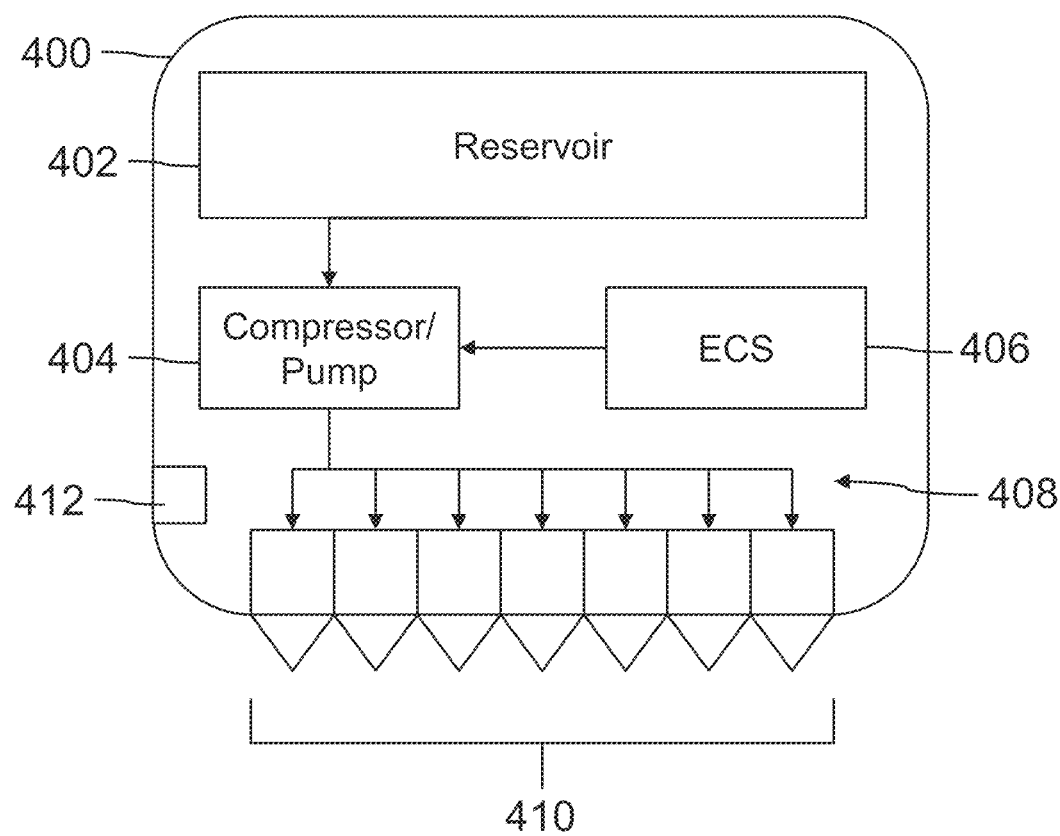
FIG. 11 is a schematic of an exemplary embodiment of a print system.

FIG. 11 is a schematic of an exemplary embodiment of a print system 400. As discussed above, a mobility platform of exemplary embodiments described herein may have one or more toolkits or tools for performing one or more tasks at a worksite. The print system 400 is one such toolkit configured to mark architectural and engineering information, including text, directly onto the unfinished floor surfaces of a construction site. This print system may be configured to mount to a mobility platform (e.g., see FIG. 1) and carry the equipment and components required to accurately and precisely mark the floor surface with a durable substance that remains visible throughout the construction process.

As shown in FIG. 11, the print system 400 includes at least one reservoir 402, at least one air compressor or pump 404, an electronic control system (ECS) 406, and at least one print head 410, all appropriately interconnected with tubes, hoses, pipe, values, connectors, wiring, switches, etc., exemplified in FIG. 11 by manifold 408. The reservoir(s) 402 may hold sufficient volumes of marking fluid for the printing tool kit to operate for a desired working period. The reservoir(s) may connect to the remainder of the print system, both upstream and downstream) in a way that delivers the marking fluid to the next component required to control and execute the desired mark. In some embodiments, the reservoir(s) holds a marking fluid, such as a pigmented ink, in tanks that can be opened to the atmosphere and filled by hand from bulk containers of marking fluid, but if desired, upon closure the reservoirs are capable of being pressurized. In some embodiments, the top of the reservoir(s) may be connected to the air compressor or air pump 404 with tube, hose or pipe, allowing the air compressor or air pump to pressurize the head space at the top of the reservoir, above the marking fluid, and therefore positively pressurize the marking fluid and feeding it through an ink feed tube, hose, or pipe that connects the bottom of the reservoir to one or more of the print heads 410. In some embodiments, a reservoir may remain open to the atmosphere, with the bottom tube, hose, or pipe connected to a pump that is capable of drawing fluid from the reservoir and feeding it downstream through the ink feed tube, hose, or pipe to the print head.

According to the embodiment of FIG. 11, each of the print heads 410 is configured to deposit the marking fluid onto the printing surface. In some embodiments, the print head may be formed of an ink feed tube connection to the reservoir 402 or pump 404, a manifold distributing the marking fluid to key components within the print head, and at least one Piezo-electric pump that, when operated, displaces small increments of the marking fluid into droplet form. The Piezo-electric pump may utilize a disc(s) that is naturally flat, but upon activation, deforms into one of two positions, the draw position or the push position. In the draw position, the positive pressure of the fluid in the ink feed tube and manifold encourages the marking fluid into the Piezo-electric chamber. In the push position, a droplet is forced out of the piezo-electric chamber and deposited onto the floor surface. In some embodiments, an array of Piezo-Electric pumps is used, allowing droplets to be simultaneously deposited in a column, a row, a matrix, a diagonal line, or any combination thereof. Such an array allows the marking of complex shapes and patterns, including text.

In some embodiments, a mobility platform includes a print system. The print system may include at least one reservoir, at least one pump, and a plurality of print heads positioned in an array. The at least one pump and plurality of print heads may be configured to allow each print head to dispense small amounts of marking fluid in droplet form. The print system may also include an electronic control system having a processor configured to execute computer readable instructions stored in memory. The electronic control system may be configured to command the plurality of prints heads and at least one pump to deposit droplets of marking fluid in column, a row, a matrix, a diagonal line, or any combination thereof. The electronic control system may also communicate with a control unit of the mobility platform to receive position and velocity information to coordinate the deposits of marking fluid. In some embodiments, the mobility platform and print system may allow the marking of text, or other complex shapes or patterns. In some embodiments, marking fluid is deposited as the mobility platform is in motion.

According to the embodiment of FIG. 11, the printing capability provided by the print system 400, and specifically the ability to print text, allows the printing system 400 to deliver unique digitally replicated information on the unfinished floor of a construction site. When deployed on a mobility platform of exemplary embodiments described herein, the print system 400 can mark the intended location of various building systems, components, and equipment, which allows contractors to accurately install their respective materials. While installation locations are currently marked by hand with points and lines, the print systems complex marking capabilities, including text, may be used to differentiate between trades, communicate non-intuitive installation instructions (i.e. denote material sizes, identify specific parts or equipment, detail configuration or orientation, and specify installation heights above the floor), and identify prefabricated part numbers. The ability to communicate prefabricated part numbers may be desirable as prefabricated construction techniques become more widespread. Accordingly, the print system of FIG. 11 in concert with mobility platforms of exemplary embodiments described herein provides the capability of communicating the exact installation location, the exact part number, and the exact installation orientation and configuration, allowing contractors to quickly and correctly install a component where it was intended.

According to the embodiment shown in FIG. 11, the ECS 406 may interface with a task controller of a mobility platform to receive triggers that activate specific actions required for placing accurate markings on the floor. Additionally, the print system may provide feedback to the mobility platform through the same interface to provide real-time information about printer performance and status. In this manner, the print system 400 may be a self-contained system that automates the process of releasing a marking fluid based on some external input related to mobility platform timing, location, or other signal as deemed necessary.

In some embodiments, an electronic control system includes a user interface, onboard processor, network connection to the mobility platform, and connection to a position-based sensor 412. The user interface may allow for actions to be executed on the system while the network connection allows for an automated process to perform the same functions. The network connection to the mobility platform can be used to provide position-based sensing data as well, but other sensors can be integrated instead. In such a configuration, both the user interface and mobility platform network interface are used to execute print-related actions such as initialization, configuration, activation, and termination actions of printing processes. Initialization may include loading predefined print tasks, configuration of specifying dynamically assigned text, markings, symbols, and otherwise to be printed, activation of triggering the print system to execute the print, and termination of completing the print process—whether in an as-expected manner or in emergency. When operating autonomously, the higher-level controller on a mobility platform may activate each trigger based on timing specified in a task file (.rgT), drive file, tool file, or other appropriate data structure including executable instructions. Additionally, the print system may provide feedback to the mobility platform through the execution of a task file, such that the print system provides useful information regarding the status of the print (e.g., completion percentage, missed locations, marking fluid levels, etc.) to assist the onboard controller in coordinating and performing further actions as needed. Feedback may include information such as current print job and configuration to allow operators to track print performance, fluid levels to allow the mobility platform to know when no further printing can be performed, and fault status to alert both mobility platform and operator to some malfunction in the system.

According to the embodiment of FIG. 11, the self-contained print system may provide a closed-loop mechanism for printing based on sensor input (e.g., from sensor 412). As each piezo-electric pump is able to release marking fluid or not, the activation of each pump may be triggered according to a timing sequence based on runtime, mobility platform position, mobility platform velocity, or other parameter that may be measured. In some embodiments, control of each pump may be performed without control functions performed by a computer or processor external to the print system. Accordingly, the print system may be modular and easily interchangeable with other tool kits or systems that may be employed on a mobility platform.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user" or an "operator." It should be appreciated that a "user" or "operator" need not be a single individual, and that in some embodiments, actions attributable to a "user" or "operator" may be performed by a team of individuals and/or an individual in combination with computer-assisted tools or other mechanisms.

Examples

In some embodiments, a mobility platform for navigation in a construction site includes a drive system configured to move the mobility platform in three degrees of freedom, at least one actuator operatively coupled to the drive system and configured to move the drive system to correspondingly move the mobility platform in at least one of the three degrees of freedom when activated, at least one tool operable to perform one or more tasks in the work site, and a controller having a motion control unit configured to selectively activate or deactivate the at least one actuator, as well as a tool control unit configured to selectively activate or deactivate the at least one tool to perform the one or more tasks.

In some embodiments, the at least one tool is selected from the group of a marker, gripper, robotic arm, rotary tool, reciprocating tool, orbital tool, and impact tool. In some embodiments, the at least one tool comprises a marker system configured to mark lines and/or text on the works site. In some embodiments, the lines and/or text indicates an instruction to install at least one piece of equipment in the work site.

In some embodiments, the holonomic drive comprises four wheels, where the at least one actuator comprises four actuators, and where each of the four actuators is coupled to one of the at least four wheels. In some embodiments, a first wheel and a second wheel of the four wheels are rotatable about a first axis, and a third wheel and a fourth wheel of the four wheels are rotatable about a second axis perpendicular to the first axis. In some embodiments, first wheel of the four wheels is rotatable about a first axis, a second wheel of the four wheels is rotatable about a second axis, a third wheel of the four wheels is rotatable about a third axis, and a fourth wheel of the four wheels is rotatable about a fourth axis, where the first, second, third, and fourth axes are independently moveable.

In some embodiments, the mobility platform further includes at least one sensor selected from the group of a drive system encoder, stereo camera, inertial measurement unit, optical flow sensor, and LiDAR unit, where the at least one sensor is configured to provide combined navigational information to the motion control unit, where the motion control unit selectively activates or deactivates the at least one actuator based on the combined navigational information.

In some embodiments, the controller further comprises a task server configured to control the motion control unit and the tool control unit, where the task server includes a computer storage medium storing task commands for operating the motion control unit and the tool control unit. In some embodiments, the motion control unit is configured as a PID or PIV controller, where the motion control unit selectively activates or deactivates the at least one actuator based on the task commands. In some embodiments, the tool control unit is configured to selectively activate or deactivate the at least one tool based on the task commands. In some embodiments, the mobility platform further includes a wireless transmitter configured to communicate with a remote server, where the task server is configured to receive the task commands from the remote server.

In some embodiments, the controller is configured to process the output of the at least one sensor to detect one or more landmarks in the construction site, and where the task commands include the locations of the landmarks. In some embodiments, the controller is configured to process the output of the at least one sensor to detect one or more load bearing structural elements of a building as landmarks. In some embodiments, the task commands guide the mobility platform along a path, the motion control unit selectively activates or deactivates the at least one actuator based on the path, and the path is configured to maximize the number of landmarks detected by the at least one sensor when the at least one actuator is selectively actuated or deactivated. In some embodiments, the controller further comprises a motion quality evaluation unit configured to compare the location of the landmarks in the task commands to the landmarks detected by the at least one sensor In some embodiments, the at least one sensor is configured to detect one or more control points disposed in the work site, where the one or more control points are existing in the construction site, and where the task commands include the location of the one or more control points. In some embodiments, the one or more control points are markers placed in the work site by a surveyor.

In some embodiments, a mobility platform further includes non-transitory computer-readable medium encoded with computer executable instructions, that, when executed by the motion quality evaluation unit, determines a position accuracy value based on the comparisons of the locations of the landmarks in the task commands and the locations of the landmarks detected by the at least one sensor, where when the position accuracy value falls below a threshold position accuracy value the motion control unit is configured to selectively activate and deactivate the at least one actuator to move the mobility platform to one of the one or more control points. In some embodiments, the controller further comprises a calibration control unit configured to adjust one or more parameters of the motion control unit based on the detected one or more control points. In some embodiments, the mobility platform further comprises a computer station located at the construction site including a graphical user interface configured to receive operator input specifying a modification of the task commands, selectively activating or deactivating at least one actuator, and/or selectively activating or deactivating the at least one tool.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A method for operating a mobility platform in a construction site based on an indication of one or more tasks to be performed at one or more task locations in the construction site and a design file representing in at least two dimensions the construction site, wherein the design file comprises one or more landmarks in the construction site, wherein the mobility platform includes at least one tool mounting location, the method comprising, with at least one processor:

generating a first path candidate for the mobility platform from a current location to the one or more task locations based on locations of the one or more landmarks and the one or more task locations, wherein the first path candidate has a first projected position accuracy of the mobility platform as the mobility platform moves along the first path candidate, wherein the first projected position accuracy is based on projected errors in position estimation from continuous displacement and/or sensing position relative to the one or more landmarks along the first path candidate;

generating a second path candidate for the mobility platform from a current location to the one or more task locations based on locations of the one or more landmarks and the one or more task locations, wherein the second path candidate has a second projected position accuracy of the mobility platform as the mobility platform moves along the second path candidate, wherein the second projected position accuracy is based on projected errors in position estimation from continuous displacement and/or sensing position relative to the one or more landmarks along the second path candidate;

providing as a generated path the first path candidate or the second path candidate based at least in part on a comparison of the first projected position accuracy and the second projected position accuracy; and providing task commands to a controller disposed on the mobility platform based on the generated path and the one or more tasks.

2. The method of claim 1, further comprising, with the controller generating control signals to move the mobility platform along the generated path and to perform the one or more tasks.

3. The method of claim 1, wherein the one or more landmarks comprise one or more physical structures in the construction site.

4. The method of claim 1, wherein the first projected position accuracy and the second projected position accuracy are based at least partly on an amount of the respective path candidate disposed within a threshold distance of the one or more landmarks.

5. The method of claim 4, wherein the threshold distance is based on detectability of the one or more landmarks by at least one sensor selected from a group of a stereo camera, mono camera, and LiDAR unit, wherein the threshold distance is set where the one or more landmarks are detectable by the at least one sensor.

6. The method of claim 1, further comprising outputting the generated path on a graphical user interface.

7. The method of claim 2, further comprising sensing the one or more landmarks with at least one first sensor selected from a group of a stereo camera, mono camera, and LiDAR unit when the mobility platform is moved along the generated path.

8. The method of claim 7, further comprising correcting movement of the mobility platform based on information received from the at least one first sensor.

9. The method of claim 8, wherein correcting the movement of the mobility platform comprises using the information provided by the at least one first sensor in feedback control.

10. The method of claim 2, further comprising:
determining a position accuracy value of the mobility platform;
comparing the position accuracy value to a predetermined position accuracy threshold;
determining, based on the comparison, that the position accuracy value is below the predetermined position accuracy threshold; and
moving the mobility platform toward one of the one or more landmarks when based on the position accuracy value falling below the predetermined position accuracy threshold.

11. The method of claim 2, further comprising:
integrating information from a first sensor to compute a first position of the mobility platform in the construction site;
continuously detecting the one or more landmarks with at least one second sensor to compute a second position of the mobility platform in the construction site; and
correcting the first position based on the second position.

12. The method of claim 1, wherein the one or more tasks include depositing marking fluid on a surface of the construction site.

13. The method of claim 12, wherein providing the task commands to the controller comprises providing commands to release the marking fluid with a print system based at least partly on a mobility platform velocity at the one or more task locations.

14. The method of claim 1, wherein:
the method further comprises:
- assigning a respective cost to the first path candidate based on the first projected position accuracy;
- assigning a respective cost to the second path candidate based on the second projected position accuracy; and providing as the generated path the first path candidate or the second path candidate based on a comparison of the first projected position accuracy and the second projected position accuracy comprises:
- selecting as the generated path the first path candidate or the second path candidate based at least in part on the respective cost being lower for the selected one of first path candidate or the second path candidate than the respective cost of the non-selected one of the first path candidate or the second path candidate.

* * * * *

UNITED STATES PATENT AND TRADEMARK OFFICE
CERTIFICATE OF CORRECTION

| | |
|---|---|
| PATENT NO. | : 11,953,909 B2 |
| APPLICATION NO. | : 16/867409 |
| DATED | : April 9, 2024 |
| INVENTOR(S) | : Derrick Morse et al. |

It is certified that error appears in the above-identified patent and that said Letters Patent is hereby corrected as shown below:

In the Claims

Column 26, Claim 10, Line 49 should read:
more landmarks based on the position accuracy Signed and Sealed this
Eleventh Day of June, 2024

Katherine Kelly Vidal
*Director of the United States Patent and Trademark Office*